US012214621B2

(12) United States Patent
Matsumoto

(10) Patent No.: US 12,214,621 B2
(45) Date of Patent: Feb. 4, 2025

(54) PNEUMATIC TIRE

(71) Applicant: The Yokohama Rubber Co., LTD., Tokyo (JP)

(72) Inventor: Kenichi Matsumoto, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 786 days.

(21) Appl. No.: 17/260,211

(22) PCT Filed: Jul. 9, 2019

(86) PCT No.: PCT/JP2019/027068
§ 371 (c)(1),
(2) Date: Jan. 13, 2021

(87) PCT Pub. No.: WO2020/013152
PCT Pub. Date: Jan. 16, 2020

(65) Prior Publication Data
US 2021/0268842 A1 Sep. 2, 2021

(30) Foreign Application Priority Data
Jul. 13, 2018 (JP) ................. 2018-133660

(51) Int. Cl.
*B60C 11/03* (2006.01)
*B60C 11/12* (2006.01)

(52) U.S. Cl.
CPC ...... *B60C 11/0304* (2013.01); *B60C 11/0306* (2013.01); *B60C 11/1236* (2013.01);
(Continued)

(58) Field of Classification Search
CPC ............. B60C 11/0304; B60C 11/1236; B60C 11/1259; B60C 2011/0348;
(Continued)

(56) References Cited

U.S. PATENT DOCUMENTS 5,804,000 A * 9/1998 Shirai ................. B60C 11/0306
152/209.15
2013/0292021 A1 11/2013 Tanaka
(Continued)

FOREIGN PATENT DOCUMENTS

DE 11 2014 006 530 T5 12/2016
JP H07-186626 7/1995
(Continued)

OTHER PUBLICATIONS

Nakayama, English Machine Translation of JP 2009051400, 2009 (Year: 2009).*

(Continued)

*Primary Examiner* — Justin R Fischer
*Assistant Examiner* — Brendon Charles Darby
(74) *Attorney, Agent, or Firm* — Thorpe North & Western

(57) ABSTRACT

A tread pattern of a pneumatic tire includes a pair of circumferential grooves and a plurality of siped lug grooves extending in a tire width direction between the pair of circumferential grooves and disposed at intervals in the tire circumferential direction. Each of the siped lug grooves includes a lug groove extending from a first circumferential groove of the pair of circumferential grooves and closed, and a sipe extending from a closed end of the lug groove toward a second circumferential groove and connected to the second circumferential groove. The plurality of siped lug grooves include at least one first siped lug groove extending while bending with an extension direction of the lug groove differing from an extension direction of the sipe, and at least one second siped lug groove extending linearly with the extension direction of the lug groove aligning with the extension direction of the sipe.

19 Claims, 5 Drawing Sheets

(52) U.S. Cl.
CPC ...... *B60C 11/1259* (2013.01); *B60C 11/1272* (2013.01); *B60C 2011/0348* (2013.01); *B60C 2011/0351* (2013.01); *B60C 2011/0353* (2013.01); *B60C 2011/0355* (2013.01); *B60C 2011/0365* (2013.01); *B60C 2011/0367* (2013.01); *B60C 2011/0372* (2013.01); *B60C 2011/0381* (2013.01); *B60C 2011/1209* (2013.01); *B60C 2011/1295* (2013.01)

(58) Field of Classification Search
CPC ..... B60C 2011/0353; B60C 2011/0372; B60C 2011/0381; B60C 2011/1209
See application file for complete search history.

(56) References Cited

U.S. PATENT DOCUMENTS

| | | | |
|---|---|---|---|
| 2015/0210122 A1* | 7/2015 | Shimizu | B60C 11/0304 152/209.25 |
| 2016/0185160 A1 | 6/2016 | Mukai | |
| 2016/0303919 A1 | 10/2016 | Yamaoka | |
| 2018/0065417 A1 | 3/2018 | Hoshiba | |
| 2018/0086147 A1 | 3/2018 | Morii | |

FOREIGN PATENT DOCUMENTS

| | | | | |
|---|---|---|---|---|
| JP | 2009051400 A | * | 3/2009 | |
| JP | 2010-126076 | | 6/2010 | |
| JP | 2012171513 A | * | 9/2012 | |
| JP | 2016-124370 | | 7/2016 | |
| JP | 2016-165981 | | 9/2016 | |
| JP | 2016182927 A | * | 10/2016 | ......... B60C 11/0302 |
| JP | 2016-203671 A | | 12/2016 | |
| JP | 2016-203703 | | 12/2016 | |
| JP | 2017-056814 | | 3/2017 | |
| JP | 2017-226366 | | 12/2017 | |
| JP | 2018043628 A | * | 3/2018 | |
| KR | 2004027035 A | * | 4/2004 | |
| WO | WO 2016/143642 | | 9/2016 | |
| WO | WO 2016/167122 | | 10/2016 | |

OTHER PUBLICATIONS

Yasunaga, English Machine Translation of JP 2018043628, 2018 (Year: 2018).*
Cho, English Machine Translation of KR 20040027035, 2004 (Year: 2004).*
Yamaura, English Machine Translation of JP 2012171513, 2012 (Year: 2012).*
Hoshino, English Machine Translation of JP 2016182927, 2016 (Year: 2016).*
International Search Report for International Application No. PCT/JP2019/027068 dated Oct. 15, 2019, 4 pages, Japan.

* cited by examiner

PNEUMATIC TIRE

TECHNICAL FIELD

The present technology relates to a pneumatic tire.

BACKGROUND ART

A typical method of improving wet performance of a pneumatic tire is to ensure drainage properties by providing a lug groove extending in a tire width direction in addition to a main groove extending in a tire circumferential direction in a tread surface of the tire. However, in such a method, there is a problem of a loud popping sound generated during running due to increased groove volume, and of degradation of performance for reducing tire noise (hereinafter, referred to as noise performance). In a tread surface provided with the main groove and the lug groove in this way, when a sipe is provided instead of the lug groove to reduce groove volume, the popping sound becomes faint, and noise performance is enhanced. However, drainage properties cannot be ensured due to reduced groove volume, and wet performance decreases.

In the related art, in a tire in which a main groove and a lug groove are formed, there is known a tread pattern in which the lug groove includes one end connected to the main groove and the other end closed in a region of a land portion and a sipe connects the other main groove being in contact with the land portion and the closed end of the rug groove (see Japan Unexamined Patent Publication No. 2017-226366).

A tire including the tread pattern of the related art described above can ensure drainage properties to a certain degree, and can suppress degradation of noise performance as compared to a tire in which both ends of a lug groove are connected to a main groove. However, there is a constant demand for improvement of wet performance of a tire.

SUMMARY

The present technology provides a pneumatic tire that provides improved wet performance as compared to a tire of the related art, while suppressing degradation of noise performance.

An aspect of the present technology is a pneumatic tire including a tread pattern in a tread portion.

The tread pattern includes
a pair of circumferential grooves extending in a tire circumferential direction, and
a plurality of siped lug grooves extending in a tire width direction between the pair of circumferential grooves and disposed at intervals in the tire circumferential direction,
and each of the siped lug grooves includes
a lug groove extending from a first circumferential groove of the pair of circumferential grooves and closed within a region between the first circumferential groove and a second circumferential groove differing from the first circumferential groove; and
a sipe extending from a closed end of the lug groove toward the second circumferential groove and connected to the second circumferential groove,
the plurality of siped lug grooves including at least one first siped lug groove extending while bending with an extension direction of the lug groove differing from an extension direction of the sipe, and at least one second siped lug groove extending linearly with the extension direction of the lug groove aligning with the extension direction of the sipe.

Preferably, the at least one first siped lug grooves include a plurality of types of siped lug grooves having different bend angles.

Preferably, the at least one first siped lug grooves are disposed forming a pair of siped lug grooves adjacent in the tire circumferential direction, and the at least one second siped lug grooves are disposed forming a pair of siped lug grooves adjacent in the tire circumferential direction.

Preferably, a ratio of the number of the first siped lug grooves to the number of the second siped lug grooves in the region ranges from 1 to 5.

Preferably, the at least one first siped lug grooves include
a siped lug groove bent projecting toward a first side in the tire circumferential direction, and
a siped lug groove bent projecting toward a second side opposite to the first side in the tire circumferential direction.

Preferably, a ratio of the number of the siped lug grooves bent toward the second side to the number of the siped lug grooves bent toward the first side ranges from 0.5 to 3.

Preferably, in the at least one first siped lug groove, a smaller angle of angles formed between the extension direction of the sipe and the extension direction of the lug groove is 30 degrees or less.

Preferably, among the siped lug grooves, as for two siped lug grooves adjacent in the tire circumferential direction, a distance A between connection positions of the sipes and the second circumferential groove is equal to a distance B between connection positions of the sipes and the lug grooves.

Preferably, the second circumferential groove has a smaller groove width than a groove width of the first circumferential groove.

Preferably, a sipe depth of the sipe is smaller at an end portion of the sipe connected to the second circumferential groove than a sipe depth at a portion of the sipe that is farther from the second circumferential groove than the end portion.

Preferably, the tread pattern includes a circumferential groove group including the pair of circumferential grooves and one or a plurality of circumferential grooves differing from the pair of circumferential grooves and extending in the tire circumferential direction, and
in the circumferential groove group, a third circumferential groove disposed opposite to the second circumferential groove with respect to the first circumferential groove and adjacent to the first circumferential groove has a smaller groove width than a groove width of the first circumferential groove.

Preferably, a groove wall opposite to a side of the second circumferential groove of a pair of groove walls of the first circumferential groove and a groove wall opposite to a side of the first circumferential groove of a pair of groove walls of the second circumferential groove continuously extend without a break in the tire circumferential direction in a surface of the tread portion.

Preferably, the first circumferential groove is disposed at a position farther from a tire centerline than the second circumferential groove.

Preferably, a vehicle mounting orientation of the pneumatic tire is specified for the tread pattern, and
the pair of circumferential grooves is disposed in a region disposed in a vehicle inner side of regions of both sides in the tire width direction of the tread pattern with the tire centerline as a reference.

According to an embodiment of the present technology, a pneumatic tire that provides improved wet performance as compared to a tire of the related art, while suppressing degradation of noise performance can be obtained.

DETAILED DESCRIPTION

Overall Description of Tire

Figure 1:
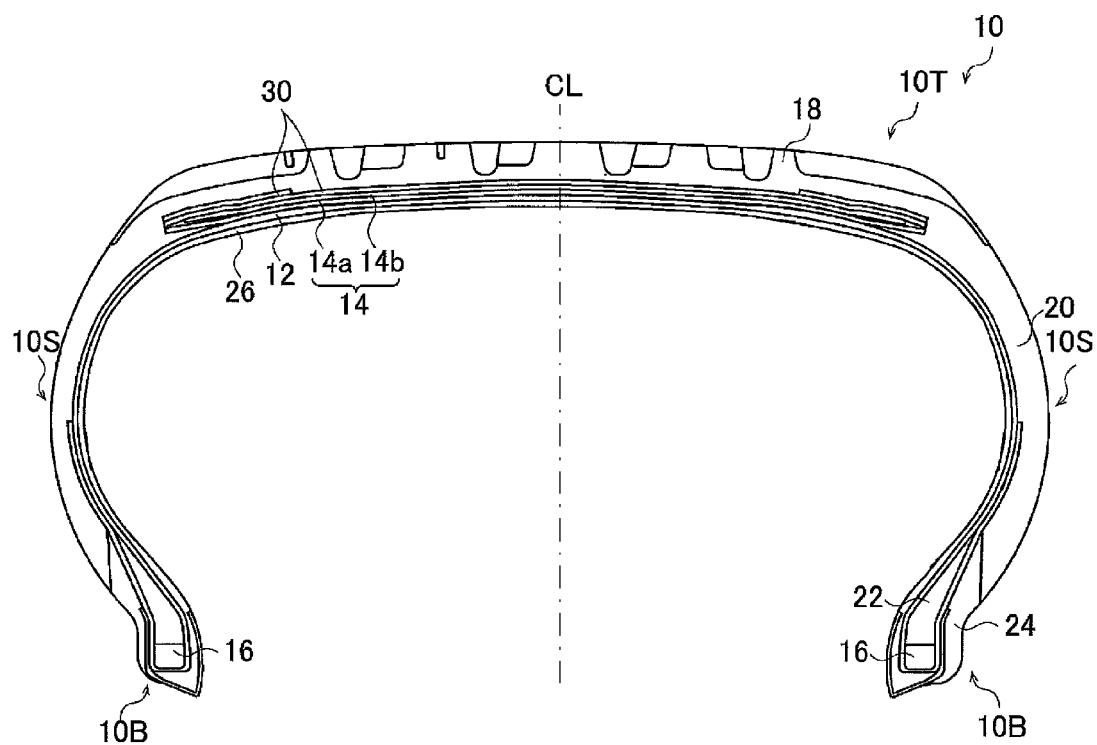
FIG. 1 is a diagram illustrating an example of a profile cross-section of a pneumatic tire according to an embodiment.

A pneumatic tire according to the present embodiment (hereinafter, simply referred to as a "tire") will be described below. The present embodiment includes various embodiments described below. FIG. 1 is a tire cross-sectional view illustrating an example of a profile cross-section of a tire 10.

The tire 10 is, for example, a tire for a passenger vehicle. A tire for a passenger vehicle refers to a tire specified in Chapter A of the JATMA YEAR BOOK 2012 (standards of The Japan Automobile Tyre Manufacturers Association, Inc.). The tire 10 can also be applied to a tire for a light truck specified in Chapter B and a tire for a truck and a bus specified in Chapter C.

Tire width direction is the direction parallel to a rotation axis of a tire. Outer side in the tire width direction is a side far from a tire centerline CL representing a tire equatorial plane in the tire width direction. Additionally, inner side in the tire width direction is a side close to the tire centerline CL in the tire width direction. Tire circumferential direction is the direction of rotation about the rotation axis of a tire. Tire radial direction is the direction orthogonal to the rotation axis of a tire. Outer side in the tire radial direction refers to the direction away from the rotation axis. Additionally, inner side in the tire radial direction refers to the direction close to the rotation axis.

Tire Structure

The tire 10 includes a tread portion 10T including a tread pattern, a pair of bead portions 10B, and a pair of side portions 10S provided in both sides of the tread portion 10T and connecting the pair of bead portions 10B with the tread portion 10T.

The tire 10 includes a carcass ply 12, a belt 14, and a bead core 16 as framework members and mainly includes a tread rubber member 18, side rubber members 20, bead filler rubber members 22, rim cushion rubber members 24, and an innerliner rubber member 26 around the framework members.

The carcass ply 12 includes a carcass ply member that is made of organic fiber covered with rubber and wound between a pair of the bead cores 16 each having an annular shape, and that is formed into a toroidal shape. The carcass ply 12 is wound around the bead cores 16 and extends to an outer side in the tire radial direction. The belt 14 is provided in an outer side of the carcass ply 12 in the tire radial direction and includes two belt members 14a and 14b. The belt 14 includes a member made of a steel cord covered with rubber and arranged at a predetermined inclination angle, for example, at from 20 to 30 degrees with respect to the tire circumferential direction. The belt member 14a that is a lower layer has a greater width in the tire width direction than the width of the belt member 14b that is an upper layer. The steel cords of the two belt members 14a and 14b are inclined in opposite directions. Thus, the belt members 14a and 14b are crossing layers and suppress expansion of the carcass ply 12 due to air pressure in a tire.

The tread rubber member 18 is provided in an outer side of the belt 14 in the tire radial direction. The side rubber members 20 are connected to both end portions of the tread rubber member 18 and form the side portions 10S. The rim cushion rubber members 24 are respectively provided at ends in inner sides of the side rubber members 20 in the tire radial direction and come into contact with a rim on which the tire 10 is mountable. Each of the bead filler rubber members 22 is provided in an outer side of each of the bead cores 16 in the tire radial direction and is interposed between a portion of the carcass ply 12 prior to being wound around the bead core 16 and a portion of the carcass ply 12 wound around the bead core 16. The innerliner rubber member 26 is provided in an inner surface of the tire 10 facing a tire cavity region that is filled with air and is surrounded by the tire 10 and a rim.

In addition, two belt covers 30 made of organic fiber covered with rubber are provided between the belt member 14b and the tread rubber member 18, and the two belt covers 30 cover the belt 14 from the outer side of the belt 14 in the tire radial direction.

Tread Pattern

Figure 2:
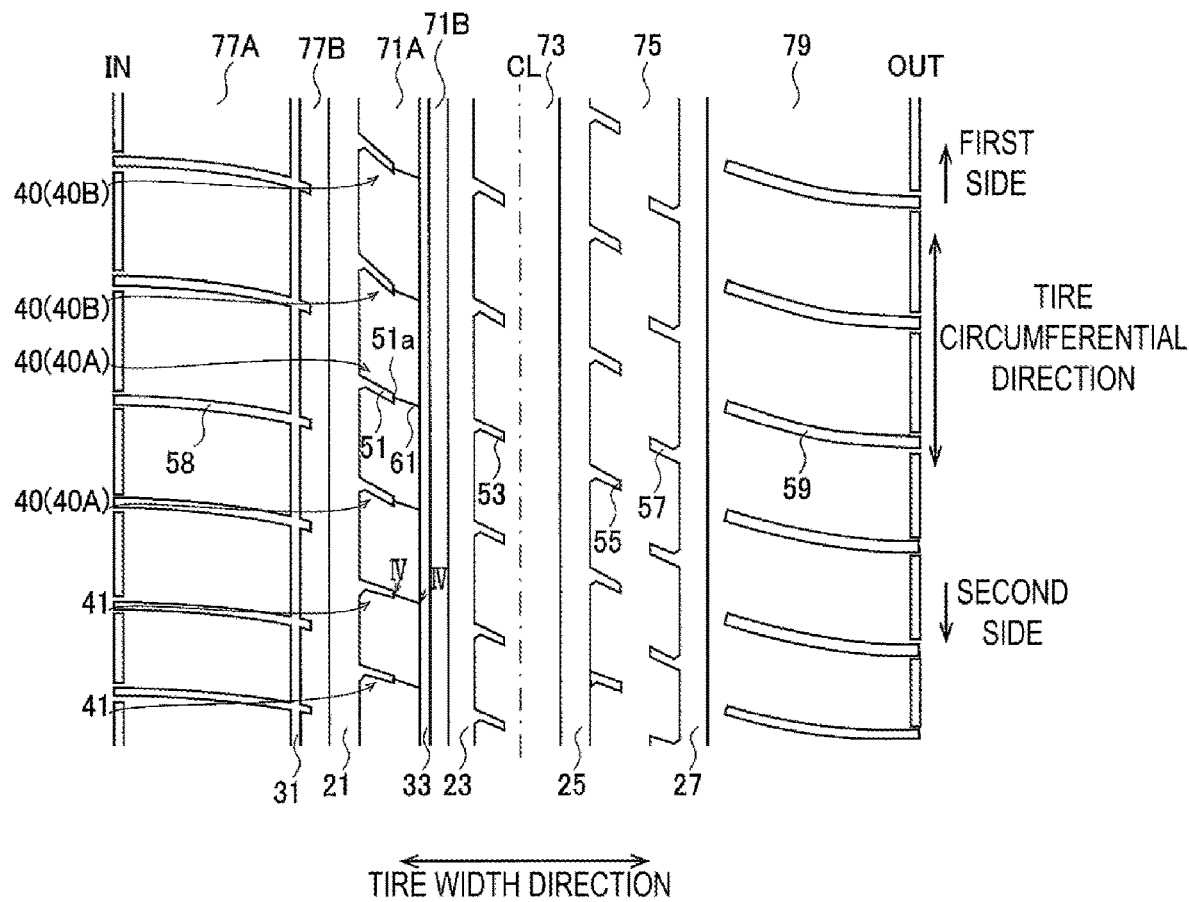
FIG. 2 is a diagram illustrating an example of a tread pattern of the tire of FIG. 1.

FIG. 2 is a diagram illustrating a portion developed into a plan view of an example of the tread pattern of the tire 10 of FIG. 1.

The tread pattern includes a pair of circumferential grooves 21 and 33 extending in the tire circumferential direction, and a plurality of siped lug grooves 40 and 41.

The circumferential grooves 21 and 33 are grooves extending in the tire circumferential direction.

Note that the tread pattern illustrated in FIG. 2 includes circumferential grooves 23, 25, 27, and 31 extending in the tire circumferential direction in addition to the circumferential grooves 21 and 33.

The circumferential grooves 21, 23, 25, and 27 are main grooves. Herein, main groove means a groove having a groove depth of, for example, from 6.5 to 9.0 mm and a groove width of, for example, from 5.0 to 15.0 mm.

The circumferential grooves 31 and 33 are narrow grooves each having a smaller groove width and a smaller groove depth than the groove width and the groove depth of each of the main grooves 21, 23, 25, and 27. Herein, narrow grooves mean grooves having a groove depth of, for example, 1.0 or more and less than 5.0 mm and a groove width of, for example, from 0.8 to 3.0 mm.

The siped lug grooves 40 and 41 extend in the tire width direction in a region 71A between the main groove 21 (first circumferential groove) and the narrow groove 33 (second circumferential groove) and are disposed at intervals in the tire circumferential direction.

The siped lug grooves 40 and 41 each include a lug groove 51 and a sipe 61.

The lug groove 51 extends from the main groove 21 and is closed within the region 71A. The groove depth of the lug groove is smaller than the groove depth of each of the main grooves 21, 23, 25, and 27 and larger than the groove depth of each of the narrow grooves 31 and 33. Herein, the lug groove has a groove depth of, for example, from 2.0 to 7.5 mm and a groove width of, for example, from 1.5 to 7.5 mm.

The sipe 61 extends from a closed end 51a of the lug groove 51 toward the narrow groove 33 and is connected to the narrow groove 33. Since the siped lug grooves 40 and 41 each include the sipe 61, the groove volume is reduced and generation of a popping sound can be suppressed and noise can be reduced as compared to a case in which the main groove 21 and the narrow groove 33 are connected by the lug groove. Herein, sipe refers to a sipe having a sipe depth of, for example, from 2.0 to 7.5 mm and a sipe width of, for example, from 0.3 to 1.0 mm.

The plurality of siped lug grooves 40 and 41 include a first siped lug groove 40 and a second siped lug groove 41.

The first siped lug groove 40 extends while bending with the extension direction of the lug groove 51 differing from the extension direction of the sipe 61, and at least one first siped lug groove 40 is provided in the region 71A. The first siped lug groove 40 is provided in such a configuration, and thus edge components extending in various directions are made in a tread surface. Thus, steering stability particularly on wet low µ road surfaces (water depth of from 1 to 3 mm) easily improves. Note that, in a case where the first siped lug groove 40 extends in a curved manner, the extension direction of the lug groove 51 differing from the extension direction of the sipe 61 means that the extension direction of the lug groove 51 and the extension direction of the sipe 61 differ from each other at the closed end 51a of the lug groove 51. In FIG. 2, the size of a bend angle of the first siped lug groove 40 is illustrated exaggeratingly in FIG. 2 to make it easy to understand the description.

The second siped lug groove 41 extends linearly with the extension direction of the lug groove 51 aligning with the extension direction of the sipe 61, and at least one second siped lug groove 41 is provided in the region 71A. The second siped lug groove 41 is provided in such a configuration, and thus during turning, a block in the region 71A is easily flexed and deforms following road surfaces. Thus, adhesion friction between the tread surface and road surfaces increases, and steering stability on wet road surfaces particularly during turning easily improves. Note that, in the region 71A, a plurality of blocks defined by the main groove 21, the narrow groove 33, and the two siped lug grooves adjacent in the tire circumferential direction are arranged in the tire circumferential direction.

In the present embodiment, the tread pattern is provided with the first siped lug groove 40 and the second siped lug groove 41 based on the finding that steering stability on wet road surfaces (hereinafter referred to as wet performance) improves in a well-balanced manner in various aspects by providing the first siped lug groove 40 and the second siped lug groove 41 within the region 71A.

A bend angle between the lug groove 51 and the sipe 61 (smaller angle of angles formed between the extension direction of the lug groove 51 and the extension direction of the sipe 61) that distinguishes the first siped lug groove 40 from the second siped lug groove 41 ranges from, for example, 1 to 5 degrees. In a case where a bend angle of the siped lug groove is equal to or larger than the bend angle that distinguishes the first siped lug groove 40 from the second siped lug groove 41 as described above, the siped lug groove corresponds to the first siped lug groove 40. In a case where the bend angle is smaller than the bend angle that distinguishes the first siped lug groove 40 from the second siped lug groove 41 described above, the siped lug groove corresponds to the second siped lug groove 41.

In the siped lug grooves 40 and 41, the sipe 61 preferably extends from an intermediate position of the groove width of the lug groove 51 at the closed end 51a of the lug groove 51.

According to an embodiment, the first siped lug groove 40 preferably includes a plurality of types of siped lug grooves having different bend angles. Accordingly, edge components extending in various directions are made in the tread surface, and contribute to improvement of wet performance. In FIG. 2, as the first siped lug groove 40, two types of siped lug grooves 40A and 40B having different bend angles are illustrated. The number of types of the first siped lug grooves 40 ranges, for example, from 2 to 5.

Note that, as illustrated in FIG. 2, a bend position in the tire width direction is preferably constant among the plurality of types of first siped lug grooves 40 having different bend angles, but a ratio between the length in the extension direction of the lug groove 51 and the length in the extension direction of the sipe 61 may be constant. Additionally, preferably, a position in the tire width direction where the lug groove 51 and the sipe 61 are connected is preferably equal between the first siped lug groove 40 and the second siped lug groove 41.

According to an embodiment, preferably, as illustrated in FIG. 2, the first siped lug grooves 40 are disposed adjacent to each other to form a pair in the tire circumferential direction, and the second siped lug grooves 41 are disposed adjacent to each other to form a pair in the tire circumferential direction. Thus, an effect of edge components made in the tread surface by the first siped lug groove 40 and an effect of easy flexing of a block obtained by the second siped lug groove 41 are emphasized, and an effect of improving wet performance increases.

In this embodiment, further, as in the example illustrated in FIG. 2, the pair of first siped lug grooves 40 is preferably configured at an identical bend angle. Additionally, a plurality of pairs having an equal bend angle may be disposed adjacent to each other in the tire circumferential direction.

According to an embodiment, a ratio of the number of the first siped lug grooves 40 to the number of the second siped lug grooves 41 in the region 71A preferably ranges from 1 to 5. In a case where the ratio exceeds 5, the number of the second siped lug grooves 41 is excessively small, and an effect of improving wet performance by easy flexing of a block may not be obtained sufficiently. In a case where the ratio is less than 1, the number of the first siped lug grooves 40 is excessively small, and an effect of improving wet performance by edge components may not be obtained sufficiently. The ratio is preferably 1.2 to 3.

Figure 5:
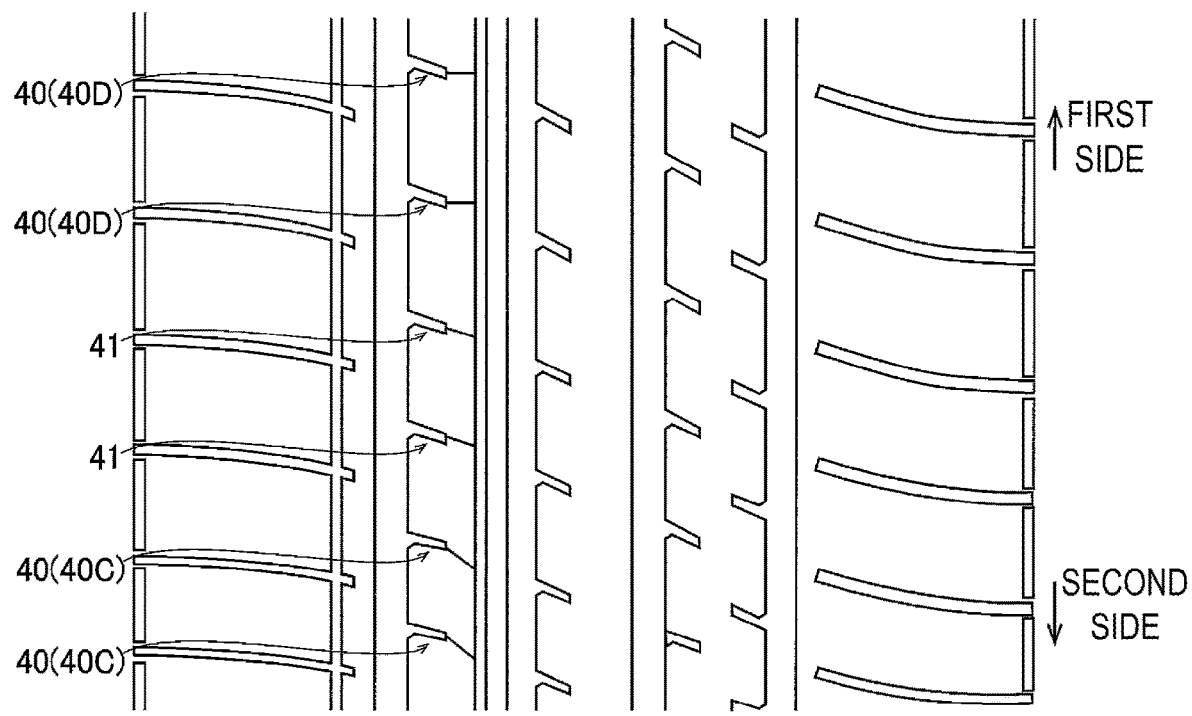
FIG. 5 is a diagram illustrating a modified example of the tread pattern of FIG. 2.

According to an embodiment, the first siped lug groove 40 preferably includes a siped lug groove 40C bending and projecting toward a first side in the tire circumferential direction and a siped lug groove 40D bending and projecting toward a second side opposite to the first side in the tire circumferential direction. Accordingly, edge components extending in more various directions are made in the tread surface, and contributes to improvement of wet performance. FIG. 5 is a diagram illustrating a portion developed in a plan view of a modified example of the tread pattern of FIG. 2.

Projecting toward first side means that a bend position of a first siped lug groove 40 projects toward a first side with respect to a straight line connecting both ends in the extension direction of the first siped lug groove 40. Similarly, projecting toward a second side means projecting toward a second side with respect to the straight line.

In this embodiment, a ratio of the number of the siped lug grooves 40D bent toward the second side to the number of the siped lug grooves 40C bent toward the first side preferably ranges from 0.5 to 3. When the ratio is less than 0.5 or exceeds 3, an effect of improving wet performance becomes small. The ratio is preferably from 1 to 2.

According to an embodiment, a bend angle of the first siped lug groove 40 is preferably 30 degrees or less. When the bend angle exceeds 30 degrees, the block rigidity of a region 71A cannot be ensured sufficiently and wet performance does not easily improve. The angle described above is preferably 10 degrees or less.

Figure 3:
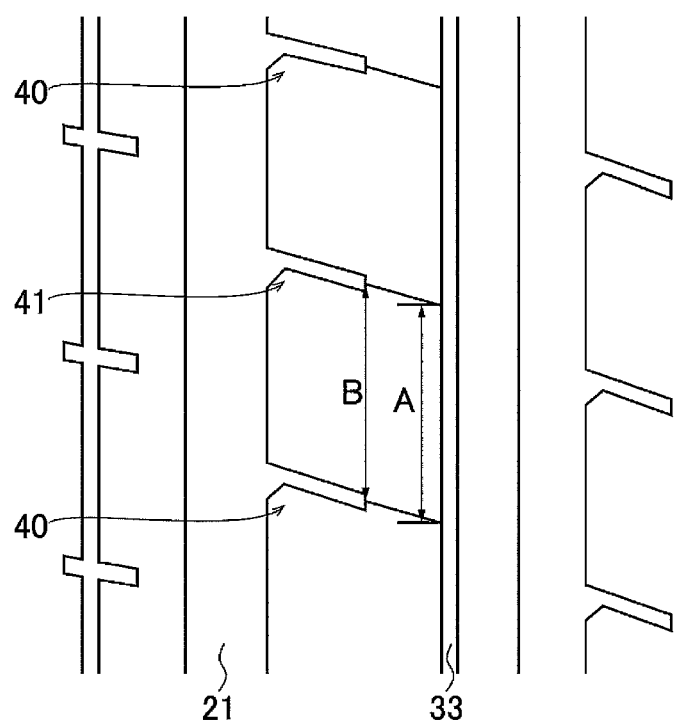
FIG. 3 is a diagram explaining a configuration of a siped lug groove according to an embodiment.

According to an embodiment, as illustrated in FIG. 3, among the siped lug grooves 40 and 41, in the two siped lug grooves adjacent in the tire circumferential direction, a distance A between connection positions of the sipes 61 and the narrow groove 33 is preferably equal to a distance B between connection positions of the sipes 61 and the lug grooves 51. FIG. 3 is a diagram explaining a configuration of a siped lug groove according to an embodiment. When the sipe 61 has a constant inclination angle with respect to the tire width direction in this way, a tire mold is easily removed from a vulcanization-molded tire, and a sipe blade for forming the sipe 61 and mounted on an inner wall of the tire mold is not easily damaged.

In this embodiment, according to a further embodiment, for all the two siped lug grooves adjacent in the tire circumferential direction, the distance A is preferably equal to the distance B. Accordingly, even when the tread pattern includes pattern elements having different circumferential lengths (pitch lengths) and combined together in the tire circumferential direction, the sipe 61 has a constant inclination angle with respect to the tire width direction. The tread pattern of the present embodiment includes a combination of a plurality of types of pattern elements having different pitch lengths, for example.

According to an embodiment, as illustrated in FIGS. 2, 3, and 5, the second circumferential groove preferably has a smaller groove width than the groove width of the first circumferential groove. The groove width of the circumferential groove to which the sipe 61 is connected is small, and thus the block rigidity of the region 71A is ensured and wet performance easily improves. On the other hand, according to an embodiment, as for the first and second circumferential grooves to which the siped lug grooves 40 and 41 are connected, the second circumferential groove may have an identical groove width to the groove width of the first circumferential groove or a groove width larger than the groove width of the first circumferential groove.

Figure 4:
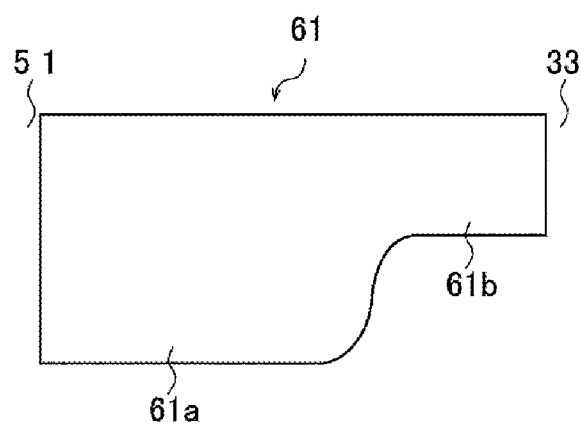
FIG. 4 is a diagram illustrating an example of a cross section of a sipe of a siped lug groove.

According to an embodiment, as in the example illustrated in FIG. 4, the sipe depth of the sipe 61 is preferably smaller at an end portion 61b of the sipe 61 connected to the narrow groove 33 than at a portion (sipe body portion) 61a of the sipe 61 located farther from the narrow groove 33 than the end portion 61b. FIG. 4 is a view taken along line IV-IV of the arrows of FIG. 2. The sipe 61 is provided with the end portion (raised bottom portion) 61b including a bottom raised in this way, and thus the block rigidity of the region 71A is ensured, and an effect of improving wet performance increases. Note that sipe body portion 61a refers to a portion of the sipe 61 having the maximum sipe depth, and the raised bottom portion 61b is a portion having a smaller sipe depth than the sipe depth of the sipe body portion 61a. Note that sipe depth herein refers to the depth of the sipe body portion 61a.

According to an embodiment, the sipe depth of the sipe body portion 61a is preferably smaller than the groove depth of the lug groove 51.

Note that the sipe 61 is preferably a sipe having a flat surface shape in which opposing sipe wall surfaces defining the sipe 61 extend in a flat surface manner. Accordingly, as compared to an aspect in which a sipe extending while bending or curving in the depth direction or the extension direction is provided, flexing of a block by the second siped lug groove 41 is easily induced.

According to an embodiment, as in the example illustrated in FIG. 2, the main groove 21 is preferably disposed at a position farther from the tire centerline CL than the narrow groove 33. The circumferential groove to which the lug groove 51 is connected is located in the outer side in the tire width direction, and thus drainage properties improve and wet performance improves. As in the example illustrated in FIG. 2, the circumferential groove to which the lug groove 51 is connected is the main groove 21 having a large groove width, and thus drainage properties further improve.

According to an embodiment, preferably, a vehicle mounting orientation of the tire 10 is specified for the tread pattern, and the pair of circumferential grooves is disposed in a region disposed in a vehicle inner side of regions of both sides in the tire width direction of the tread pattern with the tire centerline CL as a reference (region in a side indicated by "IN" with respect to the tire centerline CL in FIG. 2). The siped lug grooves 40 and 41 are connected to both of the pair of circumferential grooves, and extend through the region 71A. However, the siped lug grooves 40 and 41 are disposed in the vehicle inner side, and thus an effect of suppressing degradation of noise performance becomes large.

A ratio of the length in the extension direction of the lug groove 51 to the length in the extension direction of the sipe 61 is preferably 7:3 to 3:7. Additionally, the ratio of the length of the lug groove 51 along the tire width direction to the length in the tire width direction (width) of the region 71A is preferably 30 to 80%.

According to an embodiment, preferably, as in the example illustrated in FIG. 2, an inclination angle in the extension direction of the sipe 61 with respect to the tire width direction is constant among the plurality of siped lug grooves 40 and 41, and an inclination angle in the extension direction of the lug groove 51 with respect to the tire width direction varies among the plurality of siped lug grooves 40 and 41. When the inclination angle of the lug groove 51 varies in this way, the groove volume of the lug groove 51 varies, and thus a frequency of a popping sound is dispersed.

On the other hand, according to an embodiment, preferably, as in the example illustrated in FIG. 5, the inclination angle in the extension direction of the lug groove 51 with respect to the tire width direction is constant among the plurality of siped lug grooves 40 and 41, and the inclination angle in the extension direction of the sipe 61 with respect to the tire width direction varies among the plurality of siped lug grooves 40 and 41. FIG. 5 is a diagram illustrating a modified example of the tread pattern of FIG. 2. Similarly, in FIG. 5, the size of a bend angle of the first siped lug groove 40 is illustrated exaggeratingly to make it easy to understand the description. When an inclination angle of the sipe 61 varies among the plurality of siped lug grooves, regardless of the size of a slip angle, a portion including the sipe 61 closed and a portion including the sipe 61 open are likely to be mixed, and thus the block rigidity of the region 71A is ensured, wear becomes difficult to occur. When the inclination angle of the sipe 61 is constant, all the sipes 61 are closed within a ground contact surface only in a case where a slip angle has a certain magnitude, and the sipes 61 are likely to open in a case where the slip angle has a different magnitude from the certain magnitude. Thus, the block rigidity of the region 71A varies with the magnitude of the slip angle, and thus wear easily occurs.

Note that, in the siped lug grooves 40 and 41, one sipe 61 is connected to the lug groove 51. Accordingly, noise generated due to the sipes during running reduces, and noise performance is ensured. Additionally, an amount of sipes can be suppressed to suppress a decrease in rigidity of the region 71A.

Additionally, preferably, the lug groove 51 and the sipe 61 of the first siped lug groove 40 are inclined to an identical side in the tire circumferential direction with respect to the tire width direction, or any one of the lug groove 51 or the sipe 61 extends in a direction parallel with the tire width direction. In other words, a bend position of the first siped lug groove 40 is preferably located within the range in the tire circumferential direction in which the first siped lug groove 40 is located. Accordingly, the difficulty in flexing of a block during turning is alleviated.

According to an embodiment, as in the example illustrated in FIG. 2, the tread pattern of the present embodiment may further include lug grooves 53, 55, 57, 58, and 59.

The lug groove 53 extends from the main groove 23 within a region 73 between the main grooves 23 and 25 in the tire width direction and is closed within the region 73.

The lug groove 55 extends from the main groove 25 within a region 75 between the main grooves 25 and 27 in the tire width direction and is closed within the region 75.

The lug groove 57 extends from the main groove 27 within the region 75 in the tire width direction and is closed within the region 75.

The lug groove 58 extends within a region 77A located in an outer side of the narrow groove 31 in the tire width direction from the outer side in the tire width direction toward the main groove 21, intersects the narrow groove 31, and is closed within a region 77B between the narrow groove 31 and the main groove 21.

The lug groove 59 extends within a region 79 located in an outer side of the main groove 27 in the tire width direction from the outer side in the tire width direction toward the main groove 27, and is closed within the region 79.

A plurality of the lug grooves 53, 55, 57, 58, and 59 are disposed at intervals in the tire circumferential direction.

In the tread pattern of the example illustrated in FIG. 2, in the region 77B, no lug groove or sipe connected to the narrow groove 31 and the main groove 21 is provided, and a continuous rib is formed in the tire circumferential direction.

In a region 71B, no lug groove or sipe connected to the narrow groove 33 and the main groove 23 is provided, and a continuous rib is formed in the tire circumferential direction.

In this way, in the region of the tread pattern disposed in the vehicle inner side, many edge components extending in the tire circumferential direction are made by the two narrow grooves 31 and 33. Additionally, the rigidity of the two ribs is ensured, and thus steering stability by an inner ring during turning increases. A groove wall in a side opposite to a side of the narrow groove 33 (IN side of FIG. 2) of a pair of groove walls of the main groove 21, and a groove wall in a side opposite to a side of the main groove 21 (OUT side of FIG. 2) of a pair of groove walls of the narrow groove 33 continuously extend without a break in the tire circumferential direction in the tread surface, and thus the rigidity of the two ribs is ensured particularly in portions in both sides of the region 71A. Additionally, the narrow grooves 31 and 33 are located in both sides of the main groove 21 sandwiched between the narrow grooves 31 and 33, and thus the rigidity in a region in the vehicle inner side is well balanced. On the other hand, the narrow grooves 31 and 33 are located in the vehicle inner side, and thus noise performance is ensured. The length in the tire width direction (width) of the region 77B is preferably larger than the width of the region 71B. On the other hand, no narrow groove is provided in a region of the tread pattern disposed in a vehicle outer side.

The tread pattern of the present embodiment is not limited to the tread pattern described above. For example, in the tread pattern illustrated in FIG. 2, instead of the region 71A or in addition to the region 71A, in at least one of the region 73 or the region 75, siped lug grooves may be provided in substitution for the lug grooves 53, 55, and 57. Additionally, the number of the main grooves is not limited to four and may be three or five or more.

Comparative Examples and Examples

To examine effects of a pneumatic tire of the present embodiment, a tread pattern of the tire was varied, and wet performance and noise performance were examined. The prototype tires each had a tire size of 225/65R17 and were based on the tread pattern illustrated in FIG. 2, except for specifications indicated in Tables 1 and 2.

Tables 1 and 2 indicate a configuration related to the tread pattern of each of the tires and evaluation results for the tread pattern.

In Tables 1 and 2, "presence of pair" means whether a first siped lug groove having an identical bend angle is disposed forming a pair or not, and a second siped lug groove having an identical bend angle is disposed forming a pair or not.

"Position of first circumferential groove," is an "outer side" in a case where the first circumferential groove is farther from the tire centerline CL than the second circumferential groove, and is an "inner side" in a case where the first circumferential groove is closer to the tire centerline CL than the second circumferential groove.

"Position of siped lug groove" is an "inner side" in a case where the tire is mounted such that the region 71A where the siped lug groove is provided is disposed in the vehicle inner side, and is an "outer side" in a case where the tire is mounted such that the region 71A where the siped lug groove is provided is disposed in the vehicle outer side.

In Comparative Example 1 and Example 1, all the first siped lug grooves were set to have a bend angle of 3 degrees.

In Examples 2 to 4 and Examples 6 to 8, the first siped lug grooves had two types of bend angles of 2 degrees and 3 degrees.

In Example 5, the first siped lug grooves had two types of bend angles of 45 degrees and 60 degrees.

In Examples 1 to 8, a ratio of the number of the first siped lug grooves to the number of the second siped lug grooves was 2.

In Example 3, the first siped lug groove and the second siped lug groove having an identical bend angle were disposed not to form the pair described above.

In Example 4, the number of types of first siped lug grooves having different bend angles was two in total. In one type, the first siped lug groove was bent toward the first side, and in the other type, the first siped lug groove was bent toward the second side. Additionally, a ratio of the number of the siped lug grooves bent toward the second side to the number of the siped lug grooves bent toward the first side was 1.5.

In Example 6, the raised bottom portion was provided at a connection position of the sipe of the siped lug groove with the circumferential groove.

In Example 7, in the tread pattern according to Example 2, the position in the tire width direction of the first circumferential groove and the position in the tire width direction of the second circumferential groove were switched, and the siped lug groove was inverted.

In Example 8, the tire according to Example 2 was mounted on a test vehicle with the vehicle mounting orientation opposite to the vehicle mounting orientation in Example 2.

The test tires were evaluated for wet performance and noise performance according to the following evaluation methods. Results for the evaluation are indicated in Tables 1 and 2. In the evaluation, the test tires were mounted on wheels each having a rim size of 17×7J, mounted on a front wheel drive vehicle of engine displacement of 2400 cc, and inflated to air pressure of 230 kPa.

Wet Performance

Running at a speed of from 40 to 100 km/hr was performed in a test course of an asphalt road surface in which a road surface sprayed with a water depth of from 1 to 2 mm was provided in a partial section and a water depth of less than 1 mm was sprayed in the other sections, and a test driver performed sensory evaluation on steering characteristics when changing lanes and when cornering, and stability when traveling straight. Wet performance is expressed as index values, with Comparative Example 2 representing a tire of the related art and being assigned as the reference 100, and the larger index values indicate excellent wet performance.

Noise Performance

Each test tire was mounted on an identical test vehicle to the test vehicle used in the evaluation test for wet performance, and pass-by noise outside the vehicle was measured in accordance with the European noise regulation conditions (ECE (Economic Commission for Europe) R117). The evaluation results are expressed as index values by using reciprocals of measurement values, with Comparative Example 2 being assigned as the reference 100. The larger index value means excellent noise performance.

As a result, in a case where the index value of wet performance was 101 or more and the index value of noise performance was 99 or more, it was determined that wet performance was able to be improved as compared to wet performance in the related art while suppressing degradation of noise performance.

TABLE 1

|  | Comparative Example 1 | Comparative Example 2 | Example 1 | Example 2 | Example 3 | Example 4 |
|---|---|---|---|---|---|---|
| First siped lug groove | Yes | No | Yes | Yes | Yes | Yes |
| Second siped lug groove | No | Yes | Yes | Yes | Yes | Yes |
| First siped lug grooves having different bend angles | No | — | No | Yes | Yes | Yes |
| Presence of pair | — | — | Yes | Yes | No | Yes |
| First siped lug grooves bent in both sides in the tire circumferential direction | — | — | No | No | No | Yes |
| Bend angle of first siped lug groove | Less than 30° | — | Less than 30° | Less than 30° | Less than 30° | Less than 30° |
| Sipe raised bottom portion | No | No | No | No | No | No |
| Position of first circumferential groove | Outer side | Outer side | Outer side | Outer side | Outer side | Outer side |
| Position of siped lug groove | Inner side | Inner side | Inner side | Inner side | Inner side | Inner side |
| Wet performance | 100 | 100 | 103 | 104 | 102 | 105 |
| Noise performance | 100 | 100 | 100 | 100 | 100 | 100 |

TABLE 2

|  | Example 5 | Example 6 | Example 7 | Example 8 |
|---|---|---|---|---|
| First siped lug groove | Yes | Yes | Yes | Yes |
| Second siped lug groove | Yes | Yes | Yes | Yes |
| First siped lug grooves having different bend angles | Yes | Yes | Yes | Yes |
| Presence of pair | Yes | Yes | Yes | Yes |
| First siped lug grooves bent in both sides in the tire circumferential direction | No | No | No | No |

TABLE 2-continued

|  | Example 5 | Example 6 | Example 7 | Example 8 |
|---|---|---|---|---|
| Bend angle of first siped lug groove | More than 30° | Less than 30° | Less than 30° | Less than 30° |
| Sipe raised bottom portion | No | Yes | No | No |
| Position of first circumferential groove | Outer side | Outer side | Inner side | Outer side |
| Position of siped lug groove | Inner side | Inner side | Inner side | Outer side |
| Wet performance | 101 | 105 | 102 | 106 |
| Noise performance | 100 | 100 | 100 | 99 |

As can be seen from comparison between Comparative Examples 1 and 2 and Examples 1 to 8, the first siped lug groove and the second siped lug groove are provided in the region between the pair of circumferential grooves, and thus wet performance improves as compared to wet performance in the related art while suppressing degradation of noise performance.

As can be seen from comparison between Example 1 and Example 2, the first siped lug grooves having different bend angles are provided, and thus wet performance improves.

As can be seen from comparison between Example 2 and Example 3, the first siped lug grooves having an identical bend angle are located adjacent in the tire circumferential direction to form a pair and the second siped lug grooves having an identical bend angle are located adjacent in the tire circumferential direction to form a pair, and thus wet performance improves.

As can be seen from comparison between Example 2 and Example 4, the first siped lug groove includes the siped lug groove projecting toward each of both sides in the tire circumferential direction, and thus wet performance improves.

As can be seen from comparison between Example 2 and Example 5, the first siped lug groove has a bend angle of 30 degrees or less, and thus wet performance significantly improves.

As can be seen from comparison between Example 2 and Example 6, the raised bottom portion is provided at the connection position of the sipe of the siped lug groove with the circumferential groove, and thus wet performance improves.

As can be seen from comparison between Example 2 and Example 7, the first circumferential groove is located far from the tire centerline with respect to the second circumferential groove, and thus wet performance improves.

As can be seen from comparison between Example 2 and Example 8, the siped lug groove is disposed in the region of the tread pattern facing the vehicle inner side with respect to the tire centerline, and thus noise performance improves. Additionally, from the results of Example 8, the siped lug groove is disposed in the region of the tread pattern facing the vehicle outer side, and thus an unexpected effect of increasing the degree of improvement of a wet performance was obtained.

The pneumatic tire according to an embodiment of the present technology is described above in detail. However, the pneumatic tire according to an embodiment of the present technology is not limited to the above-described embodiments or examples and may of course be enhanced or modified in various ways without departing from the scope of the present technology.

The invention claimed is:

1. A pneumatic tire comprising a tread pattern in a tread portion,
the tread pattern comprising:
a pair of circumferential grooves extending in a tire circumferential direction; and
a plurality of siped lug grooves extending in a tire width direction between the pair of circumferential grooves and disposed at intervals in the tire circumferential direction;
each of the siped lug grooves comprising:
a lug groove extending from a first circumferential groove of the pair of circumferential grooves and closed within a region between the first circumferential groove and a second circumferential groove differing from the first circumferential groove; and
a sipe extending from a closed end of the lug groove toward the second circumferential groove and directly connected to the second circumferential groove;
the plurality of siped lug grooves comprising at least one first siped lug groove extending while bending with an extension direction of the lug groove differing from an extension direction of the sipe, and at least one second siped lug groove extending linearly with the extension direction of the lug groove aligning with the extension direction of the sipe; wherein
for each of the siped lug grooves, the extension direction of the lug groove and the extension direction of the sipe incline toward a same side in the tire circumferential direction.

2. The pneumatic tire according to claim 1, wherein the at least one first siped lug groove comprises a plurality of types of siped lug grooves having different bend angles.

3. The pneumatic tire according to claim 1, wherein the at least one first siped lug groove is disposed forming a pair of siped lug grooves adjacent in the tire circumferential direction, and the at least one second siped lug groove is disposed forming a pair of siped lug grooves adjacent in the tire circumferential direction.

4. The pneumatic tire according to claim 1, wherein a ratio of a number of the first siped lug grooves to a number of the second siped lug grooves in the region ranges from 1 to 5.

5. The pneumatic tire according to claim 1, wherein the at least one first siped lug groove comprises
a siped lug groove bent projecting toward a first side in the tire circumferential direction, and
a siped lug groove bent projecting toward a second side opposite to the first side in the tire circumferential direction.

6. The pneumatic tire according to claim 5, wherein a ratio of a number of the siped lug grooves bent toward the second side to a number of the siped lug grooves bent toward the first side ranges from 0.5 to 3.

7. The pneumatic tire according to claim 1, wherein, in the at least one first siped lug groove, a smaller angle of angles formed between the extension direction of the sipe and the extension direction of the lug groove is 30 degrees or less.

8. The pneumatic tire according to claim 7, wherein the smaller angle is 10 degrees or less.

9. The pneumatic tire according to claim 1, wherein, among the siped lug grooves, as for two siped lug grooves adjacent in the tire circumferential direction, a distance A between connection positions of the sipes and the second circumferential groove is equal to a distance B between connection positions of the sipes and the lug grooves.

10. The pneumatic tire according to claim 1, wherein the second circumferential groove has a smaller groove width than a groove width of the first circumferential groove.

11. The pneumatic tire according to claim 10, wherein a sipe depth of the sipe is smaller at an end portion of the sipe connected to the second circumferential groove than a sipe depth at a portion of the sipe that is farther from the second circumferential groove than the end portion.

12. The pneumatic tire according to claim 10, wherein the tread pattern comprises a circumferential groove group comprising the pair of circumferential grooves and one or a plurality of circumferential grooves differing from the pair of circumferential grooves and extending in the tire circumferential direction, and in the circumferential groove group, a third circumferential groove disposed opposite to the second circumferential groove with respect to the first circumferential groove and adjacent to the first circumferential groove has a smaller groove width than a groove width of the first circumferential groove.

13. The pneumatic tire according to claim 1, wherein a groove wall opposite to a side of the second circumferential groove of a pair of groove walls of the first circumferential groove and a groove wall opposite to a side of the first circumferential groove of a pair of groove walls of the second circumferential groove continuously extend without a break in the tire circumferential direction in a surface of the tread portion.

14. The pneumatic tire according to claim 1, wherein the first circumferential groove is disposed at a position farther from a tire centerline than the second circumferential groove.

15. The pneumatic tire according to claim 1, wherein a vehicle mounting orientation of the pneumatic tire is specified for the tread pattern, and the pair of circumferential grooves is disposed in a region disposed in a vehicle inner side of regions of both sides in the tire width direction of the tread pattern with the tire centerline as a reference.

16. The pneumatic tire according to claim 1, wherein at least some sipes of the sipes are closeable within a ground contact surface of the tread portion.

17. The pneumatic tire according to claim 1, wherein a sipe width of each of the sipes is narrower than a groove width of each of the lug grooves.

18. The pneumatic tire according to claim 1, wherein the tread pattern comprises four circumferential main grooves, the first circumferential groove being one of the four circumferential main grooves and the second circumferential groove having a narrower width than any of the four circumferential main grooves.

19. The pneumatic tire according to claim 1, wherein the first circumferential groove and the second circumferential groove define a first land portion therebetween, the tire further comprising a third circumferential groove defining a second land portion between the third circumferential groove and the second circumferential groove, the second land portion only including non-siped lug grooves which terminate at one end in the second land portion and the third circumferential groove having a width of from 5 mm to 15 mm.

* * * * *